T. ZETTERLUND.
SEMI-AUTOMATIC ROLLER RETAINER MILLING MACHINE.
APPLICATION FILED OCT. 3, 1918.

1,311,583.

Patented July 29, 1919.
7 SHEETS—SHEET 1.

Fig. 1.

WITNESS:
J. P. Britt

INVENTOR
Theodor Zetterlund
BY Geo. W. Young
ATTORNEY

T. ZETTERLUND.
SEMI-AUTOMATIC ROLLER RETAINER MILLING MACHINE.
APPLICATION FILED OCT. 3, 1918.

1,311,583.

Patented July 29, 1919.
7 SHEETS—SHEET 2.

WITNESS:

INVENTOR

BY

ATTORNEY

T. ZETTERLUND.
SEMI-AUTOMATIC ROLLER RETAINER MILLING MACHINE.
APPLICATION FILED OCT. 3, 1918.

1,311,583.

Patented July 29, 1919.
7 SHEETS—SHEET 4.

Fig. 4.

WITNESS:
T. P. Britt

INVENTOR
Theodor Zetterlund
BY Geo. A. Young
ATTORNEY

T. ZETTERLUND.
SEMI-AUTOMATIC ROLLER RETAINER MILLING MACHINE.
APPLICATION FILED OCT. 3, 1918.

1,311,583.

Patented July 29, 1919.
7 SHEETS—SHEET 6.

WITNESS:
J. F. Britt

INVENTOR
Theodor Zetterlund
BY Geo. W. Young
ATTORNEY

T. ZETTERLUND.
SEMI-AUTOMATIC ROLLER RETAINER MILLING MACHINE.
APPLICATION FILED OCT. 3, 1918.

1,311,583.

Patented July 29, 1919.
7 SHEETS—SHEET 7.

WITNESS:

INVENTOR
Theodor Zetterlund
BY
ATTORNEY

UNITED STATES PATENT OFFICE.

THEODOR ZETTERLUND, OF MILWAUKEE, WISCONSIN, ASSIGNOR TO HARLEY-DAVIDSON MOTOR COMPANY, OF MILWAUKEE, WISCONSIN.

SEMI-AUTOMATIC ROLLER-RETAINER MILLING-MACHINE.

1,311,583.  Specification of Letters Patent.  Patented July 29, 1919.

Application filed October 3, 1918. Serial No. 256,714.

*To all whom it may concern:*

Be it known that I, THEODOR ZETTERLUND, a citizen of the United States, and resident of Milwaukee, in the county of Milwaukee and State of Wisconsin, have invented certain new and useful Improvements in Semi-Automatic Roller - Retainer Milling - Machines; and I do hereby declare that the following is a full, clear, and exact description thereof.

My invention relates to new and useful improvements in automatic milling machines, and has for its primary object the provision of a machine for automatically making a series of cuts in a roller retainer ring or other work member.

It is in general the object of my invention to simplify and otherwise improve the structure and to increase the efficiency of machines of this character, as well as to provide for a most ready insertion of work members in the machine, a more specific object in this latter connection being the provision of an arrangement whereby work members to be milled may be secured in the machine during the milling operation on other work members in the machine, whereby upon the completion of the milling operation on said other work members, the first named work members may be immediately shifted for engagement with the cutters so that the milling operation of the machine need be interrupted for but very brief periods of time incidental to moving the previously secured work members into opposition to the cutting means of the machine.

A further object resides in the provision of an automatic milling machine adapted to procure a succession of cuts in a work member, and wherein provision is made for automatically stopping operation of the machine upon completion of the certain series of cuts.

A still further object resides in the provision of a machine of this character wherein automatic alternate shifting movements of the cutting means and work carrying means is procured to effect the series of cuts.

A still further object resides in the provision of an arrangement including movable turret carried chucks adapted to be successively opposed to the cutters, wherein means is provided for locking the chuck or chucks remote from the cutters against movement, to facilitate the insertion or removal of work members.

With the above and other objects and advantages in view, which will be apparent as the description proceeds, my invention resides in the novel features of construction, combination and arrangement of parts as hereinafter more particularly described and defined by the appended claims.

In the accompanying drawings:

Fig. 12 is an elevational view of the roller retainer ring comprising the work of the present embodiment of my invention, and provided with the cuts imparted to it thereby.

Referring now more particularly to the accompanying drawings, there is provided a main casing or frame which is mounted upon a suitable oil catching table or base 20 and which comprises side walls 21 and a front wall 22, a cutter casing being disposed at the rear of the main casing, and the walls of the main casing are merged into a turret seating annulus 23 which is disposed in a plane inclined downwardly toward the rear of the machine.

A circular turret head block 25 is provided, having an annular recess 26 in its bottom which slidably receives the casing annulus 23, the outer periphery and top of said annulus being engageable with the corresponding surfaces of the recess, and said recess being of such depth as to permit upward movement of the turret head without disengaging it from the annulus. The turret is normally held against rotation on the seating annulus 23 by lugs 27 in diametrically opposed portions of its recess which are engageable in sockets 28 in the sides of the annulus 23. To facilitate this engagement of the lugs in the sockets, the top face of the annulus is inclined downwardly at 29 toward one side of each socket. The turret head block is provided with a pair of upward projections 30 in each of which is journaled a pair of chucks A, and for lifting the turret head whereby to permit rotation of the head to dispose either of said pair of chucks at the rear of the machine for operation thereon by the cutter members later to be described, a shaft 31 extends upwardly in the casing and has its upper end reduced and engaged in a central bore of the head block. The lower end of the shaft is slidable in a sleeve 32 which is fitted in an enlarged tubular portion 33 of the rear wall 22. A pair of ears 34 project upwardly from the sleeve 32 and mount a gear pinion 35 which meshes with a series of circular rack teeth 36 on the shaft. A crank arm 37 extends forwardly from the gear pinion and has its bored end pivotally connected with the upper end of the link 38 which is connected at its lower end to a foot pedal 39 carried by a depending link 40 of the table. Thus, by depressing the treadle 39 the turret head will be lifted, to disengage its lugs 27 from the sockets 28 of the seating annulus, whereby the turret head may be freely rotated, it being noted that the shaft 31 is fixedly secured in the turret head by a transverse shaft 41 extending through said shaft 31 and entirely through the turret head for a purpose later described, the rack teeth 36 retaining proper mesh with the lifting pinion 35 by reason of the circular shape of said rack teeth.

Before describing the work holding members of the machine in detail, I will first describe the work for which the present embodiment of my invention is adapted. This comprises an annular band or ring W in one side of which is milled a series of substantial radial slots X, this operation comprising the first step in the formation of a conventional retainer ring for roller bearings, the slots roughly cut by the present machine being subsequently drilled out whereby the sides are curved to properly receive the rollers.

Figure 11:
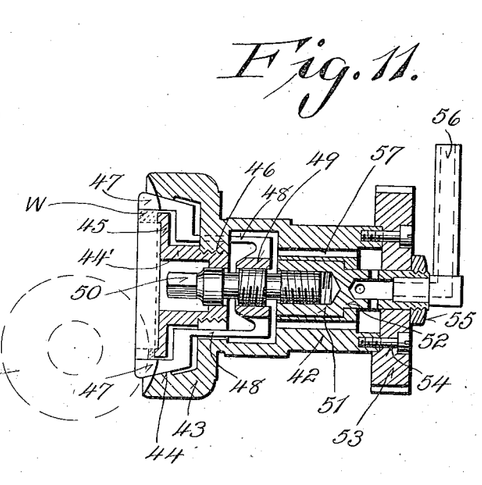
Fig. 11 is a vertical sectional view through one of the work holding chuck members.

Each of the work holding chucks A of the present machine comprises a casing 42 passed transversely through and journaled in one end portion of one of the upward projections 30 of the turret head block. The casing is enlarged outwardly of the block to form a cup 43 having an internal cam face 44 at its mouth. Disposed within the cup is a sleeve 44' carrying a ring seating flange 45 at its outer end and having its inner end threaded in a flange 46 projecting from the inner periphery of the casing at the base of the cup. Clamping dogs 47 are disposed between the seating flange 45 and the wall of the cup and are carried by resilient arms 48 which project through the flange 46 and are secured integrally at their inner ends to a collar 49 which is threaded on a shaft 50 having a journal bearing at its outer end within a reduced inner portion of the seating sleeve 44, and having its inner end threaded for engagement in an enlarged tubular end 51 of a shaft 52 which is extended through the casing, with its enlarged end seated in a reduced portion of the casing, this shaft 52 being also extended through a gear wheel 53 which is fixed on the inner end of the casing by means of screws 54. A nut 55 is threaded on the projected end of the shaft 52 and bears against the gear wheel, thus holding all of the parts in assembled relation.

That end of the shaft 50 which projects into the seating sleeve 44 is squared for the engagement of a suitable wrench, and thus upon turning the shaft 50 in either direction, the dogs 47 will be either advanced or retracted, the threads of the collar 49 and of the shaft enlargement 51 extending in opposite directions whereby a compound movement of the collar 49 is procured. The arms 48 resiliently urge the dogs 47 into engagement with the sleeve 44, and thus upon shifting the dogs inwardly against the action of said arms, said cam surface will move the dogs together to firmly clamp a retainer ring W on the seating flange 45. For blowing out accumulations of cuttings in the casing, an air blast conduit 56 communicates with a passage formed in the inner end of the shaft 52, said passage being branched to discharge into the inner end of the casing 42, and the reduced intermediate portion of the casing is provided with passages 57 extending longitudinally thereof for conveying the air outwardly in the casing whereby the air will blow about the dogs and dislodge any particles which might interfere with their efficient operation. The shaft 52 is rotatable on the conduit, whereby rotation of the chuck is permitted, under influence of hereinafter described means engaging the gear 53.

The space between the chuck carrying projections 30 of the turret head is inclosed by a shield plate 58 having its end portions downturned, said plate carrying a partition wall 59 which extends transversely of the turret head and which has its central portion threaded to receive a bolt 60 passed therethrough and threaded in the upper end of the lifting shaft 31 to secure the shield plate in place, this bolt and the upper portion of the said shaft being bored to permit supply of oil to the transversely disposed shaft 41 which is passed through the shaft 31.

A comparatively simple and compact turret structure has thus been provided which may be readily manipulated to dispose either of its pairs of work carrying chucks at the rear of the machine for coaction with the cutting means thereof, whereby the forward chucks may be manipulated to replace work articles therein while the rear chucks are being milled, it being noted that the entire turret structure is inclined downwardly toward the rear of the machine, whereby the forward chucks are tilted upwardly for the convenience of the operator.

Entering now into a description of the cutting means of the machine, it is noted that a pair of lugs 61 project rearwardly from the seating annulus 23 of the main casing and in which is mounted a journal sleeve 62 extending transversely at the rear of the machine. The main drive shaft 63 of the machine is journaled in this sleeve and carries a suitable drive pulley 64. Journaled on the sleeve at the outer sides of the lugs 61 are a pair of collars 65 which project inwardly from a cutter casing 66, this casing being in the form of a boot open at its top and bottom, the front and rear walls of the casing being braced by transverse members 67. The casing extends above and below the journal sleeve 62, and is thus mounted for movement of its upper end toward and away from the chucks. Journaled in the upper portions of the ends of the casing is a shaft 68 carrying pairs of cutters 69, each pair of cutters being disposed at equal distances from a vertical plane passed through the cutter axis of one of the rear chucks. The cutter shaft 68 is continuously driven from the main drive shaft 63 by a pinion 69ª on said shaft 63 meshing with an idle gear 70 which in turn meshes with a gear 71 on the cutter shaft, these gears 70 and 71 being disposed in recesses 72 and 73 of the adjacent end wall of the cutter casing, which are closed by a closing plate 74. Oil is supplied to the pairs of cutters through tubes 75 in communication with a flexible common supply tube 76 secured to the cutter casing, and in the operation of the machine a continuous flow of oil passes over the cutters and down through the casing on to the table.

Mechanism is provided for procuring alternate synchronized feeding and retracting movements of the cutter casing and rotative step movements of the rearwardly disposed chucks, whereby to automatically procure the succession of cuts. This mechanism includes a main shaft 77 which is journaled in a bushing sleeve 78 disposed in a bearing enlargement 79 of one of the main casing walls 21, said shaft being also journaled in a bushing 80 in a bearing wall 81 of the main casing, and extending parallel to the main drive shaft 61 and the cutter shaft 68. The bearing sleeve 78 and the adjacent end of the shaft 77 project beyond the adjacent casing wall into a space inclosed by a casing section 82 secured to the main casing wall, and loosely mounted on the projected end of the sleeve 78 is a worm gear 83 meshing with a worm 84 carried on an inclined shaft 85 journaled in the casing section 82 and carrying at its upper end a bevel gear 86 meshing with a bevel gear 87 on the end of the main drive shaft 63 whereby the worm is continuously driven in the operation of the machine. The outer face of the worm gear 83 carries a series of clutch teeth 88 adapted for engagement by corresponding teeth of a clutch collar 89 which is splined on the projected end of the shaft 77, said sleeve having a bearing in and extending outwardly of the casing section 82 whereby reciprocation of the sleeve will procure selective driving actuations of the shaft 77.

Figure 9:
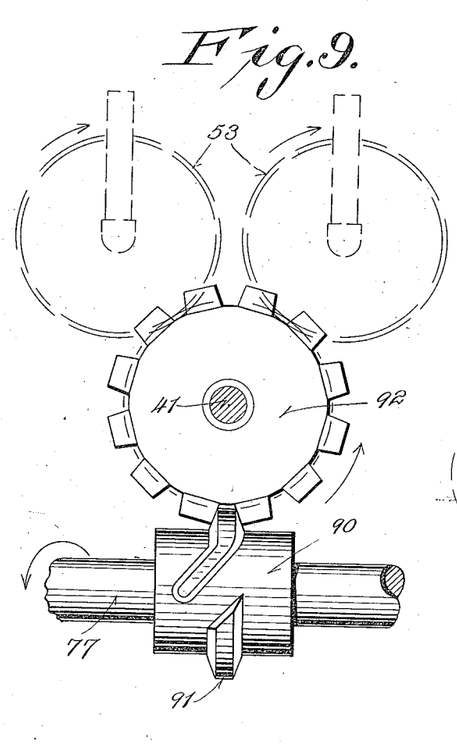
Fig. 9 is a partly diagrammatic view showing the intermittent rotative drive for the work holding chucks.

A cam collar 90 is fixed on the shaft 77 under the central portion of the turret, and mounted on this collar is a cam rib 91 extending peripherally around the collar, and lying for a major portion of its length in a single plane. As shown more particularly in Fig. 9, the forward end of the rib, with respect to the normal direction of rotation of the shaft, is inclined laterally so that its extremity is offset from the extremity of the other end portion of the rib. Journaled on each end portion of the shaft 41 in the lower portion of the turret head is a wheel 92 which carries on the inner side of its periphery a series of gear teeth meshing with both the gear wheels 53 of the adjacent pair of work chucks. At the outer side of its periphery each of the wheels 92 carries a series of roller teeth 93 corresponding in number to the number of reciprocations which it is desired to impart to the cutting mechanism with respect to a single work member, and the spaces between these rollers, which are slightly beveled are such as to snugly receive the correspondingly beveled cam rib 91. Thus, as the shaft 77 rotates, the wheel 92 and consequently the work carrying chucks will be held against rotation, but as the laterally turned end of the cam rib engages the wheel 92, the wheel will be shifted to impart a step rotation thereto, the other end of the cam rib engaging between a succeeding pair of rollers to repeat the step rotation of the wheel 92 upon each complete rotation of the shaft 77.

Figure 1:
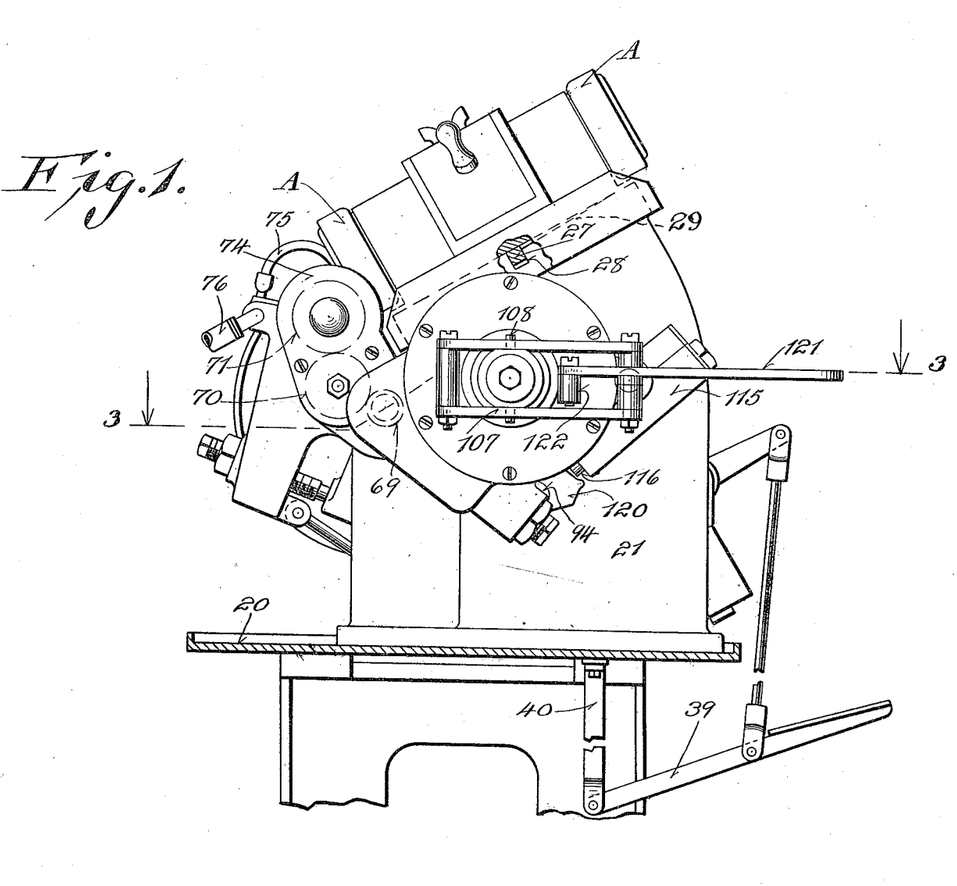
Figure 1 is a side elevational view of my automatic milling machine adapted for cutting the roller slots of roller retainer rings.
Figure 1A:
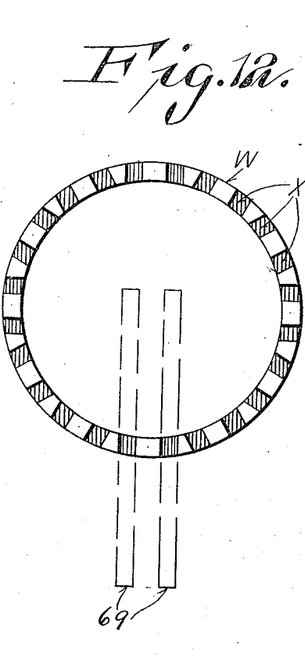
Figure 2:
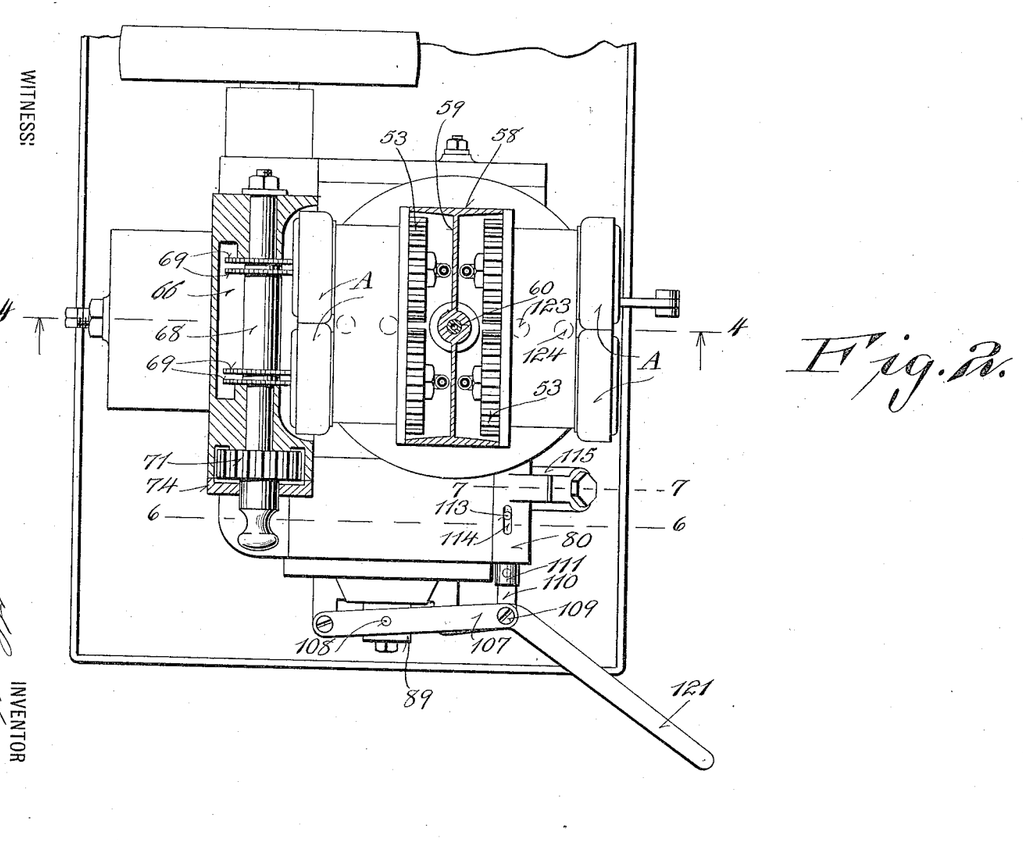
Fig. 2 is a plan view of the machine, portions of the cutter casing and the turret head being broken away.
Figure 3:
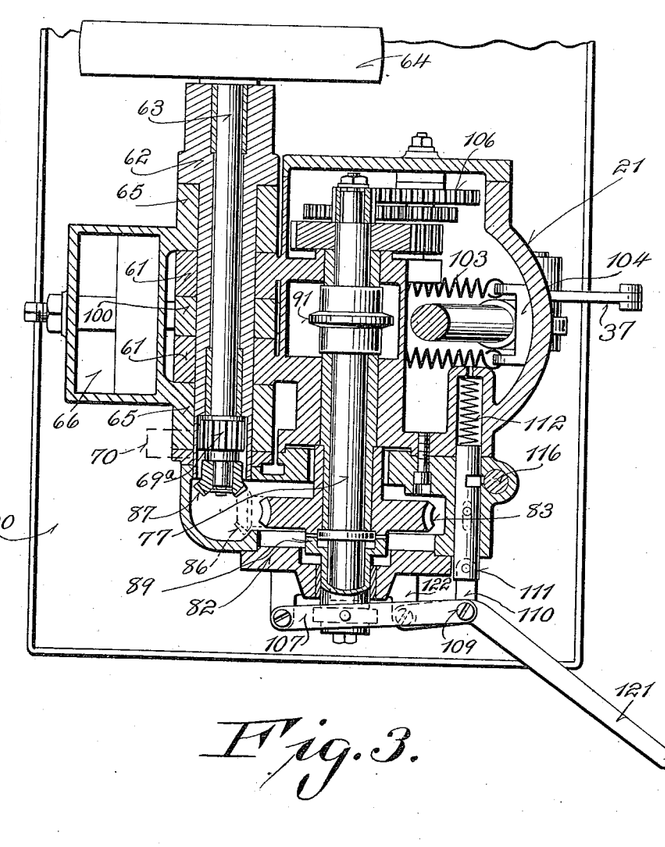
Fig. 3 is a horizontal sectional view through the machine on planes indicated by the irregular line 3—3 of Fig. 1.
Figure 4:
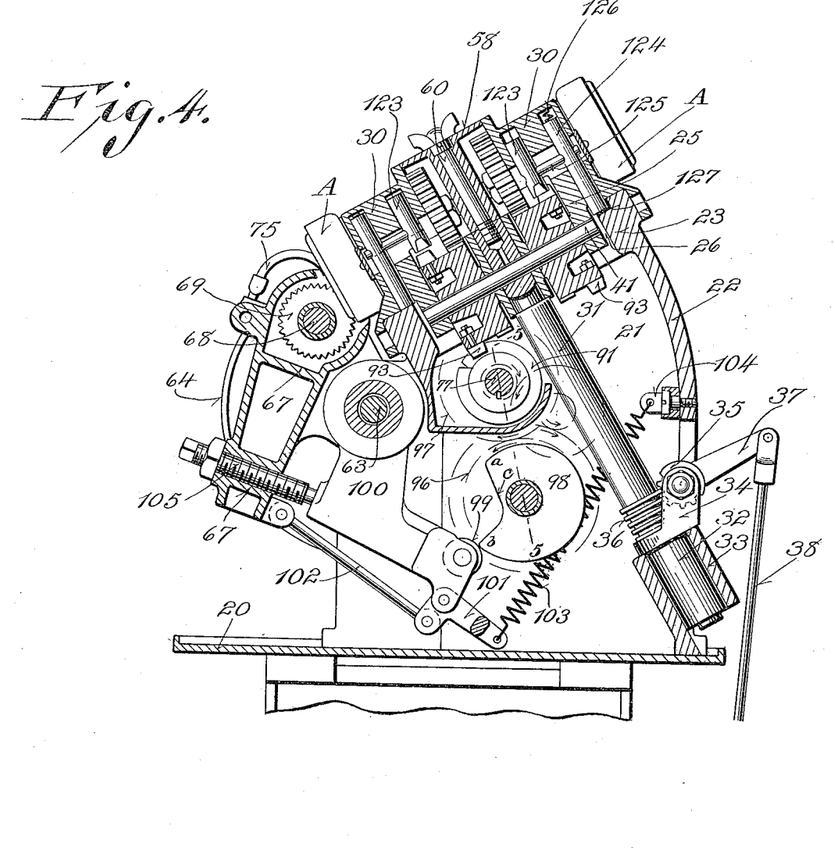
Fig. 4 is a vertical sectional view taken centrally through the machine on the line 4—4 of Fig. 2.
Figure 5:
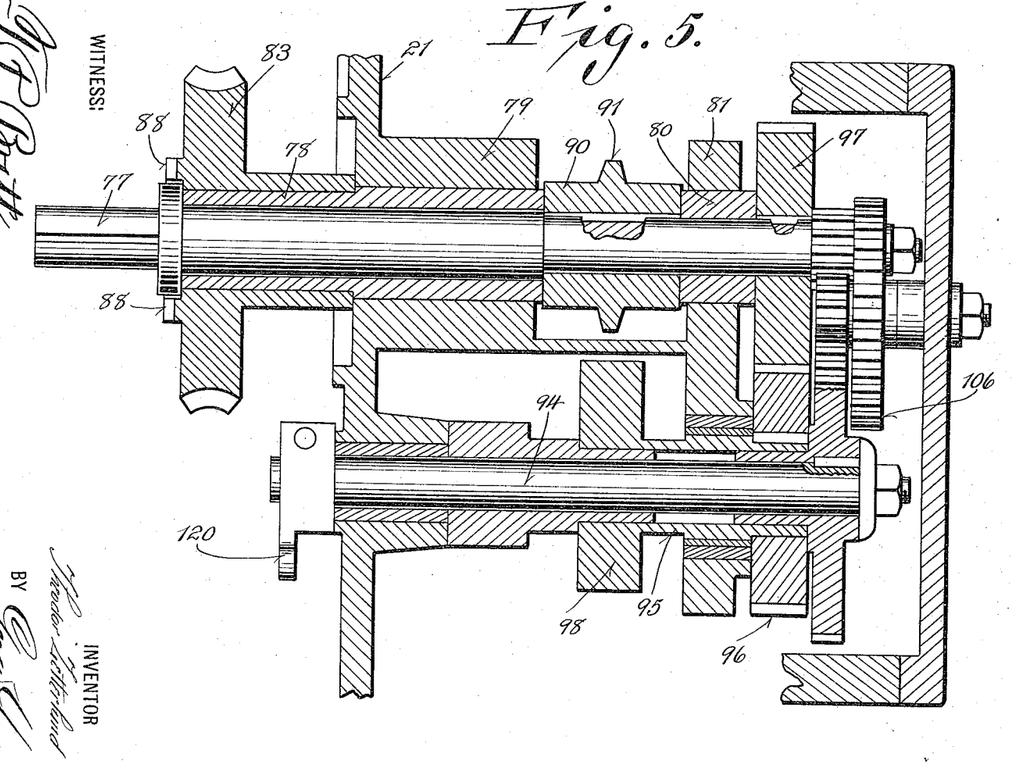
Fig. 5 is a detail sectional view of the gearing for effecting rotation of the work and for stopping the operation of the machine, upon completing the series of cuts.
Figures 6, 7, 8:
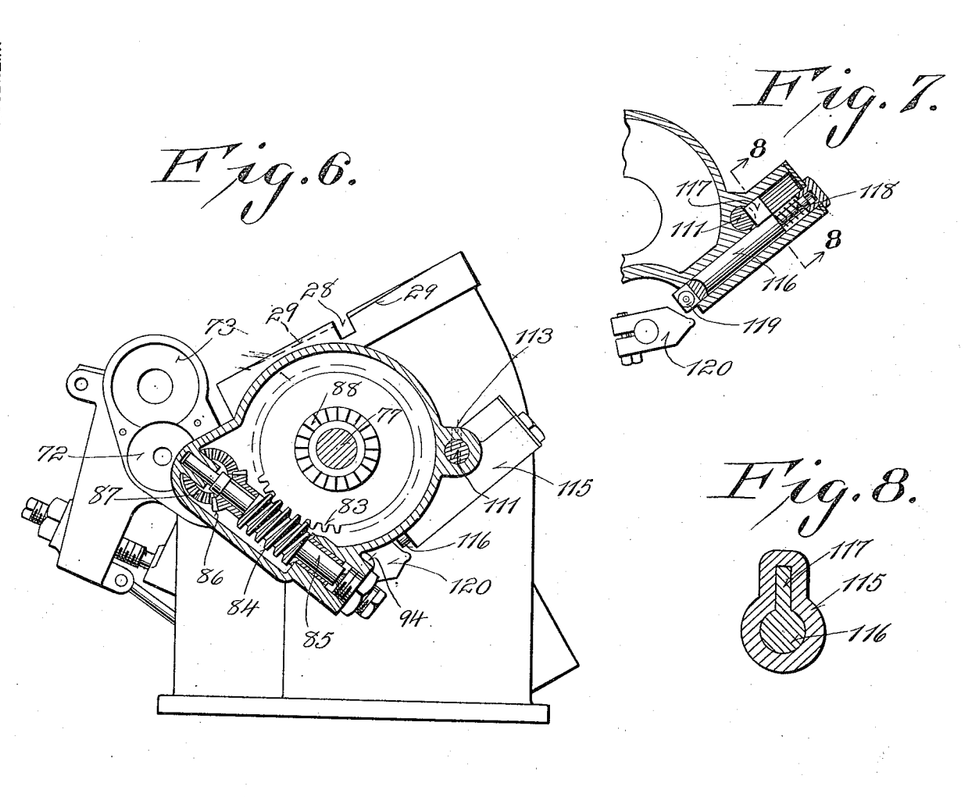
Fig. 6 is a sectional view on the line 6—6 of Fig. 2.
Fig. 7 is a detail sectional view on the line 7—7 of Fig. 2 showing the release plunger for stopping operation of the machine.
Fig. 8 is a transverse section through said plunger on the line 8—8 of Fig. 7.

This shaft 77 also controls the movement of the cutter casing, thus, a shaft 94 is journaled in the main casing under the shaft 77, and parallel therewith, and loosely mounted on one end portion of this shaft is a collar 95 which is journaled in the bearing wall 81 and which carries at one side of said wall a gear wheel 96 meshing with an equal gear wheel 97 fixed on the shaft 77. At the other side of the cam wall, and under the cam collar 90 a cam 98 is carried by the sleeve, and against the peripheral face of this cam is urged a roller 99 carried on an angular arm 100 having its upper end enlarged and journaled on the journal sleeve 62. Pivoted on the lower roller carrying end of this arm is an angle lever 101, one arm of which is pivotally connected by a link 102 with the lower end of the cutter casing. The other arm of the angle lever is branched and has secured to its branches the lower ends of a pair of retractile springs 103 which extend upwardly and rearwardly of the casing at the sides of the cam 98 and lift shaft 31 and have their upper ends secured to a bracket 104 on the rear wall of the main casing. The cutter casing is thus urged to rotation in a counterclockwise direction, with its lower end urged toward the arm 100, and the lower end of the casing is adjustably held with respect to the arm by an adjusting screw 105 passed through and threaded in one of the transverse members 67 of the casing, and engaging the angle portion of the arm whereby the arm is in turn urged to engage its roller 99 against the cam wheel. The peripheral surface of the cam is gradually increased in radius through a major portion of the cam from a point $a$ on its periphery to a point $b$, and the cam is cut away between the points $a$ and $b$ to provide a cam surface $c$ which extends from the point $a$ inwardly in a plane which passes between the point $b$ and the axis of the cam, the cutaway surface between the point $b$ and the surface $c$ being substantially radial and merging at its inner portion into the surface $c$. Thus, upon rotation of the cam, in a counter-clockwise direction as shown in Fig. 4, the point $b$ determines the inner limit of feeding movement of the cutter disks and as the cam rotates to move the point $b$ past the rollers 99, said roller and consequently the arm 100 and the cutter casing will swing to rock the upper end of the casing outwardly to retract the cutters from the work in the chucks. It is at this time that the rotative step movement of the chucks is instituted, by reason of the inclined end portion of the cam rib 91. As the rotation of the cam 98 continues, the roller 99 riding on the surface $c$ will shift the cutters to initial cutting engagement with work held in the chucks, and in rotation of the cam to engage the roller with the major cam surface from $a$ to $b$, the cutters will be fed into the work material by reason of the gradual increase in radius, the work-holding chucks in the meantime remaining stationary by reason of the travel of the major portion of the rib 91 between the rollers of the control wheel 92.

Since the gears 96 and 97 are equal in size, a single reciprocative actuation of the cutter members will be procured coincident with each rotative step of the rearward chucks, the rotative step movements of the chucks being timed to occur upon outward movement of the cutter members.

To automatically stop the operation of the machine upon completion of the annular series of cuts in the work members, a reducing train of gearing 106 is provided between the shaft 77 and the shaft 94 on which the sleeve of the cam 98 is mounted. This reduction of the gearing corresponding to the number of reciprocations of the cutting members necessary in a complete cycle of the operation of the machine, whereby a complete revolution will be imparted to the shaft 94 incidental to a complete cycle of cutting reciprocations, and incidental to a complete rotation of each of the rear chucks. During the operation of the machine, the clutch collar 89 is held in engagement with the clutch teeth of the worm gear 83 by spanner levers 107 pivoted to the casing rearwardly of the shaft 77 and carrying pins 108 engaging the clutch sleeve. The forward ends of these levers are connected by a pin 109 to which is connected a link 110 pivoted to a shaft 111 slidable in the casing section 80 and resiliently urged outward by a spring 112, the sliding movement of the shaft being limited by a pin 113 carried thereon and slidable in a slot 114 in the casing section. Slidably mounted in a bearing enlargement 115 formed on the casing section outwardly of and transversely of the shaft 111 is a plunger 116 which carries a wing 117 engageable in a transverse notch in the shaft 111, this plunger being resiliently urged by a spring 118 for engagement of its wing in said notch. The lower end of the plunger carries a roller 119 which is engageable by a trip arm 120 clamped on the outer end of the shaft 94. When the clutch sleeve 89 is in engaging position, the wing 117 engages in the notch of the shaft 111 and thus holds the shaft and consequently the clutch against movement under influence of the spring 112.

As the cutting operation proceeds, the shaft 94 will be gradually rotated, until its trip arm 120, which is beveled, engages the roller 119, thus shifting the plunger 116 outwardly to disengage its wing 117 from the shaft 111, permitting outward movement of the shaft under influence of the spring 112 to disengage the clutch and stop the operation of the machine, the outward movement of the lever arms 107 imparting at the same time a visual signal to the operator of the completion of cutting actuations. For again engaging the clutch to start a new cycle of operation, a hand lever 121 is pivoted adjacent one end of the pin 109 of the spanner levers, the inner end of the handle being also pivoted to a lug 122 outstanding from the casing between the clutch sleeve 89 and the pin 109. Thus inward swinging movement of the handle will engage the clutch to start operation of the machine, and at the same time will shift the shaft 111 inwardly to engage the wing 117 in a notch of said shaft and thus automatically continue the operation.

Figure 10:
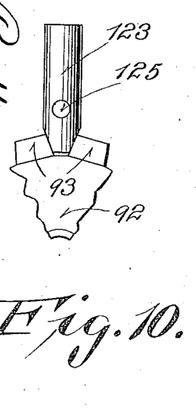
Fig. 10 is a detail view of the plunger for locking the chucks against rotation when remote from the cutters.

For automatically locking the chucks at the forward portion of the machine against rotation, it being noted that their control wheel 92 is free, so that the chucks may be most readily manipulated for changing work members therein, a bar 123 is vertically slidable in each turret head projection 30 between its pair of chucks, and this bar has its lower end beveled to engage between the uppermost pair of rollers 93 on the control wheel. Outwardly of the bar 123 a second bar 124 is journaled in each turret head projection 30 and is connected with the bar 123 by a transverse pin 125. This bar is resiliently urged downwardly by a spring 126 disposed in the upper portion of the socket of the projection 30 in which it is mounted. When the projection 30 is disposed at the forward portion of the machine, this bar 123 seats in a socket 127 in the annulus 23 of the main casing, thus permitting the bar 123 to engage between the rollers 93 of the control wheel 92 and thus holding both the wheel and its chucks against rotation. When the bar is disposed in the rear portion of the machine, its lower end abuts on the annulus 23 and holds the bar 123 out of contact with the rollers, thus permitting a step rotation of the chucks. It is noted that as the turret head is lifted from the annulus 23, the bar 123 is permitted to engage between the rollers of the rear control wheel 92 and thus the control wheel is held for subsequent meshing engagement with the cam wheel 21.

It is thus seen that a comparatively simple machine for effecting the milling operation set forth has been provided, which requires a minimum amount of attention and effort on the part of the operator, and does not impose the requirement of any particular degree of skill on the part of the operator.

In operation, it is merely necessary for the operator to inset a pair of rings in the forward pair of work holding chucks A, and then to turn the turret to dispose the chucks rearwardly in the machine, the cutting operation being instituted by swinging the handle 22 inwardly to lock the clutch sleeve 82 in operative position by engagement of the wing 117 in the notch of the shaft 111. The cutting operations then proceed automatically and ample time is afforded the operator to remove finished work rings and insert fresh rings in the chucks A, which are forwardly disposed, the completion of the cutting operations being indicated by the automatic release of the drive clutch as heretofore described.

What is claimed is:

1. A milling machine including a shiftable cutter member, a rotatable turret, a plurality of rotatable work carrying members carried by the turret and selectively movable upon rotation of the turret into opposition to the cutter member, and means engageable by the work holding member in opposition to the cutter member for imparting a series of successive rotative steps to each work holding member when in opposition to the cutter member.

2. A milling machine including a cutter member, a rotatable turret shiftable upwardly and downwardly, means for holding the turret against rotation in downward position, and a plurality of work carrying members carried by the turret and selectively movable upon rotation of the turret into opposition to the cutter member.

3. A milling machine including a main casing, an annulus on said casing, a rotatable turret shiftably mounted on the annulus, means for shifting the turret upwardly, means for holding the turret against rotation in downward position, and a plurality of work carrying members carried by the turret and selectively movable upon rotation of the turret into opposition to the cutter member.

4. A milling machine including a cutter member, a rotatable turret, a pair of rotatable work carrying members at remote portions of the turret selectively movable upon rotation of the turret into opposition to the cutter member, means for imparting successive rotative steps to each work carrying member when disposed in opposition to the cutter member, and means for holding the work carrying members against rotation when remote from the cutter member.

5. A milling machine including a cutter member, a rotatable turret shiftable in direction of its rotative axis, a plurality of rotatable work carrying members carried by the turret and selectively movable upon rotation of the turret into opposition to the cutter member, a continuously rotating drive member mounted adjacent the portion of the turret in opposition to the cutter member, and drive connections for said work holding members adapted for selective engagement with said drive member.

6. A milling machine including a cutter member, a rotatable turret shiftable in direction of its rotative axis, a plurality of rotatable work carrying members carried by the turret and selectively movable upon rotation of the turret into opposition to the cutter member, a drive member mounted adjacent the portion of the turret in opposition to the cutter member, drive connections for said work holding members adapted for selective engagement with said drive member, and means engageable with the drive connections when remote from the drive member for holding the work holding members against rotation.

7. A milling machine including a cutter member, a rotatable turret shiftable in the direction of its rotative axis, a pair of rotatable work carrying members at remote portions of the turret, wheels mounted in the turret in drive connection with said work carrying members, annular series of teeth on said wheels, a drive shaft mounted adjacent that portion of the turret in opposition to the cutter member, a cam rib on said shaft, and teeth on each of said wheels engageable with the cam rib when the wheel is adjacent the drive shaft.

8. A milling machine including a shiftable cutter member, a rotatable turret shiftable in direction of its rotative axis, a plurality of rotatable work carrying members carried by the turret and selectively movable upon rotation of the turret into opposition to the cutter member, a drive member mounted adjacent the portion of the turret in opposition to the cutter member, drive connections for said work holding members adapted for selective engagement with said drive member, and means in gear connection with the drive member for procuring shifting movement of the cutter member.

9. A milling machine including a shiftable cutter member, a rotatable turret, a plurality of work carrying members rotatably carried by the turret and selectively movable upon rotation of the turret into opposition to the cutter member, wheels mounted in the turret in drive connection with said work carrying member, and drive means engageable by the wheels of the respective work holding members when moved to opposition to the cutter for procuring rotative steps of the work carrying members.

10. A milling machine including a work carrying member, a journal member, a cutter frame pivoted on the journal member, a cutter carried by the frame for movement toward and away from the work carrying member, an arm independently pivoted on the journal member, a control cam engageable by said arm, means for driving said cam, an adjustable spacing member between the cutter frame and said rim, and means resiliently urging the cutter frame and arm together and toward the cam.

11. A milling machine including a work carrying member, a journal member, a cutter frame pivoted on the journal member, a cutter carried by the frame for movement toward and away from the work carrying member, an arm pivoted on the journal member, a control cam engageable by said arm, means for driving said cam, a lever pivoted on the arm, a link connection between the lever and cutter casing, and a spring connected with said lever for rocking the cutter casing and arm toward the cam.

12. A milling machine including a cutter member, a rotatable turret, means for procuring alternate reciprocating movements of the cutter member and rotative step movements of the work carrying member, said means including a drive member and releasing clutch, and means operable upon a predetermined number of movements of the cutter member and work carrying member for releasing said clutch.

13. In a milling machine of the class described, a head stock, a chuck casing rotatably mounted in the head stock, means for imparting rotative step movements to the chuck casing, work holding dogs in the chuck casing, and means including a shaft extending axially in the chuck casing and having a squared end engageable from the outer end of the casing for actuating said dogs.

14. A milling machine including a cutter member, a shaft slidably and rotatably mounted adjacent the cutter member, a turret on said shaft, a plurality of work holding members carried by the turret and movable selectively into opposition to the cutter member, and means for shifting said shaft.

15. A milling machine including a cutter member, an upstanding slidably journaled shaft adjacent said cutter member, a turret mounted on the upper end of the shaft, a plurality of work carrying members on the turret movable selectively into opposition to the cutter member, a series of annular rack teeth on the shaft, a gear member meshing with said teeth, a treadle, and a crank connection between said treadle and gear member.

16. A milling machine including a work carrying member, a journal member, a cutter frame pivoted on the journal member, a cutter carried by the frame for movement toward and away from the work carrying member, an arm independently pivoted on the journal member, a control cam engageable by said arm, means for driving said cam, an adjustable projection on the cutter frame engaging said arm, a lever pivoted on the arm, a link connecting said lever and the cutter frame, and a spring engaging said lever for urging the cutter frame and arm together and toward the cam.

17. A milling machine including a main frame, an upstanding shaft slidably journaled in the main frame, a turret mounted on the upper portion of said shaft, rotatable work holding members carried by the turret, means for sliding the shaft, a shaft, journaled under the turret, mechanism carried by the turret and said shaft for rotating the work holding members, a cutter mechanism intermediately pivoted at one side of the turret and including cutters opposing selective work holding members, a cam shaft journaled under the first named shaft, a cam on said shaft, means yieldably urging the lower portion of the cutter mechanism toward said cam, and means for rotating said shafts.

18. A milling machine including a cutter member, a rotatable work carrying member, drive means for procuring alternate reciprocating movement of the cutter member and rotative step movements of the work carrying member, a clutch for controlling said drive means, means for holding said clutch in actuation, and a trip member connected with said drive means for rotation, thereby, said trip member having one revolution to each revolution of the work holding member and being engageable with the clutch holding means for releasing the same.

In testimony that I claim the foregoing I have hereunto set my hand at Milwaukee, in the county of Milwaukee, and State of Wisconsin.

THEODOR ZETTERLUND.

Copies of this patent may be obtained for five cents each, by addressing the "Commissioner of Patents, Washington, D. C."